United States Patent [19]

Akutsu

[11] Patent Number: 4,737,885
[45] Date of Patent: Apr. 12, 1988

[54] PLASMA GENERATOR

[75] Inventor: Kensuke Akutsu, Kawasaki, Japan

[73] Assignees: Nippon Paint Co., Ltd., Osaka; Sankyo Dengyo Co., Ltd., Tokyo, both of Japan

[21] Appl. No.: 821,919

[22] Filed: Jan. 21, 1986

[51] Int. Cl.$^4$ .............................................. H05H 1/24
[52] U.S. Cl. ............................. 361/225; 422/186.07; 422/907; 204/176
[58] Field of Search ...................... 361/215, 225, 230; 422/186.04, 186.07, 186.12, 186.13, 906, 907; 55/131; 204/176, 149, 290 R, 290 F

[56] References Cited

U.S. PATENT DOCUMENTS

| 3,734,846 | 5/1973 | McNobey et al. | 422/907 X |
| 4,222,748 | 9/1980 | Argo et al. | 55/131 X |
| 4,623,365 | 11/1986 | Bergman | 55/131 |
| 4,650,648 | 3/1987 | Beer et al. | 422/186.07 |

Primary Examiner—L. T. Hix
Assistant Examiner—D. Rutledge
Attorney, Agent, or Firm—Wenderoth, Lind & Ponack

[57] ABSTRACT

A plasma generator including an excitation electrode and an opposite electrode confronting the excitation electrode such that plasma is generated upon impression of a high voltage between the excitation electrode and the opposite electrode. The plasma generator further includes granular material which is at least partially composed of dielectric grains and is provided between the excitation electrode and the opposite electrode.

5 Claims, 13 Drawing Sheets

PLASMA GENERATOR

BACKGROUND OF THE INVENTION

The present invention generally relates to an activation apparatus for activating surfaces of articles such as powdery or granular material, etc. through production of physical or chemical reactions on the surfaces of the articles by irradiating, under various gaseous atmospheres and at varied temperatures and pressures, plasma ions onto the articles so as to impart a lipophilic nature, hydrophilic nature and lyophilic nature to the articles or improve dispersion property of the articles and more particularly, to a plasma generator for use in the activation apparatus or the like.

SUMMARY OF THE INVENTION

An essential object of the present invention is to provide a plasma generator which is capable of generating a large amount of plasma ions.

In order to accomplish this object of the present invention, there is provided, in one aspect of the present invention, a plasma generator including an excitation electrode and an opposite electrode confronting said excitation electrode such that plasma is generated upon impression of a high voltage between said excitation electrode and said opposite electrode, the improvement comprising: granular material which is at least partially composed of dielectric grains and is provided between said excitation electrode and said opposite electrode.

Furthermore, there is provided, in another aspect of the present invention, a plasma generator including an excitation electrode and an opposite electrode confronting said excitation electrode such that plasma is generated upon impression of a high voltage between said excitation electrode and said opposite electrode, the improvement comprising: a porous sheet which is at least partially made of dielectric material and is provided between said excitation electrode and said opposite electrode.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE PREFERRED EMBODIMENTS

Referring now to the drawings, there are shown in FIGS. 1 to 6, plasma generators K1 to K6 according to first to sixth embodiments of the present invention, respectively.

Figure 1:
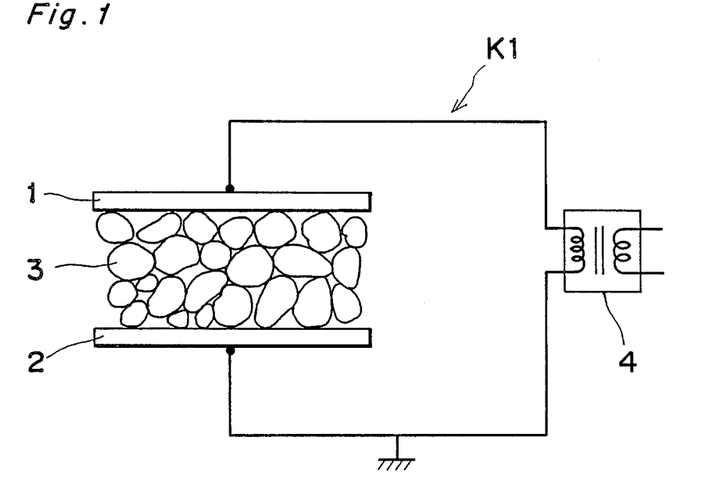
FIGS. 1 to 6 are schematic views of plasma generators according to first to sixth embodiments of the present invention, respectively.

In the plasma generator K1 of FIG. 1, an electrode 1 (corresponding to an excitation electrode) and an electrode 2 (corresponding to an opposite electrode) confront each other. Each of the electrodes 1 and 2 has a width extending over a certain distance at right angles to the plane of the sheet of drawings of FIG. 1. Dielectric granular material 3 is filled, as a dielectric member, between the electrodes 1 and 2. Depending upon operating conditions of the plasma generator K1, grains of the dielectric granular material 3 may have various shapes such as a spherical shape, a polyhedral shape, a fibrous shape, a rodlike shape, etc.

Meanwhile, when AC high voltage from a high-voltage AC power source 4 is applied between the electrodes 1 and 2, plasma is generated along surfaces of the dielectric granular material 3. Since the dielectric member provided between the electrodes 1 and 2 is constituted by the dielectric granular material 3 having a very large surface area, an extremely large amount of plasma is generated by the plasma generator K1.

Figure 2:
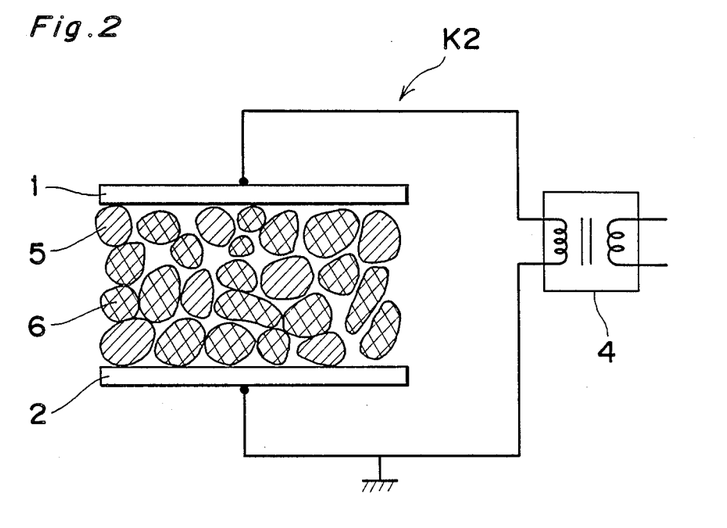

In the plasma generator K2 of FIG. 2, the dielectric granular material 3 of the plasma generator K1 is replaced by dielectric granular materials 5 and 6 having dielectric constants different from each other. In the plasma generator K2, plasma ions are generated in a peculiar way as compared with those of the plasma generator K1, namely sparsely in some portions of the plasma generator K2 but in a concentrated manner in other portions of the plasma generator K2.

In the plasma generators K1 and K2, dielectric sheets 8 and 9 (FIG. 3) can also be attached to inner faces of the electrodes 1 and 2, respectively.

Figure 3:
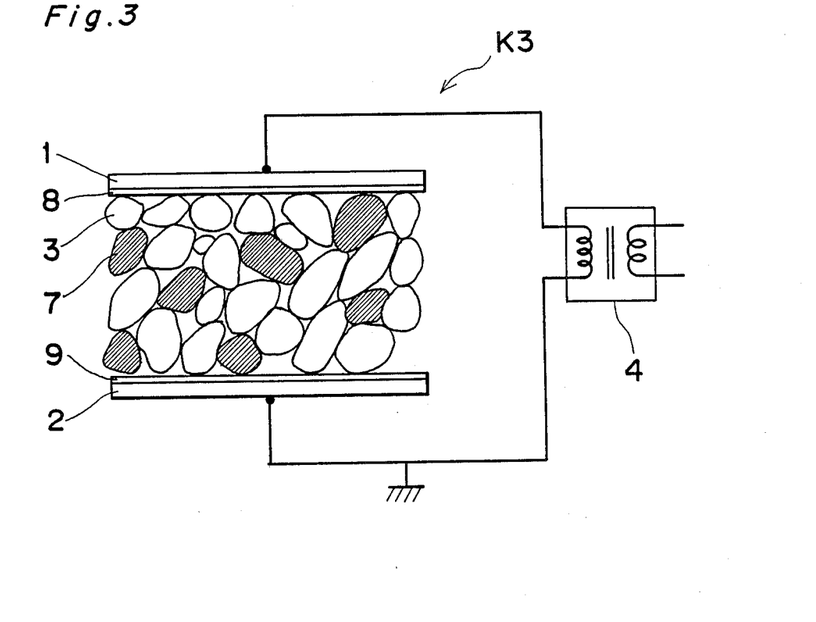

In the plasma generator K3 of FIG. 3, metallic or electrically conductive granular material 7 is mixed into the dielectric granular material 3 so as to further promote generation of plasma ions. Inner faces of the electrodes 1 and 2 may be coated with the dielectric sheets 8 and 9, respectively.

Figure 4:
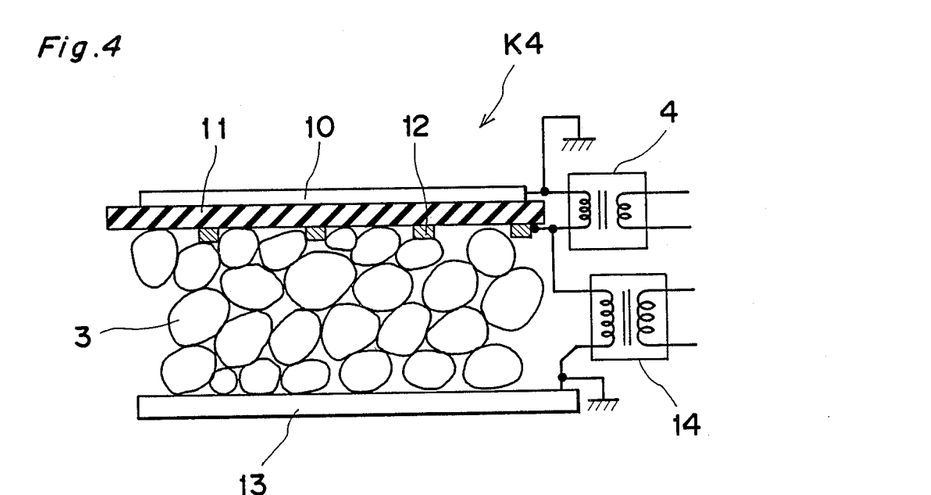

Meanwhile, in FIG. 4, the plasma generator K4 includes an electrode 10 (corresponding to an opposite electrode), an electrode 12 (corresponding to an excitation electrode), a dielectric sheet 11 disposed between the electrodes 10 and 12, an electrode 13 (corresponding to an opposite electrode) confronting the electrode 12 and a high-voltage AC power source 14 such that the dielectric granular material 3 is filled between the electrodes 12 and 13. When an AC high voltage from the high-voltage AC power source 4 is applied between the electrodes 10 and 12 via the dielectric sheet 11, plasma creeping along surfaces of the electrode 12 and the dielectric sheet 11 is produced. Furthermore, an AC high voltage from the high-voltage AC power source 14 is applied between the electrodes 12 and 13 through the dielectric granular material 3 such that space in plasma state produced among adjacent ones of grains of the dielectric granular material 3 can be controlled by the power source 14.

Figure 5:
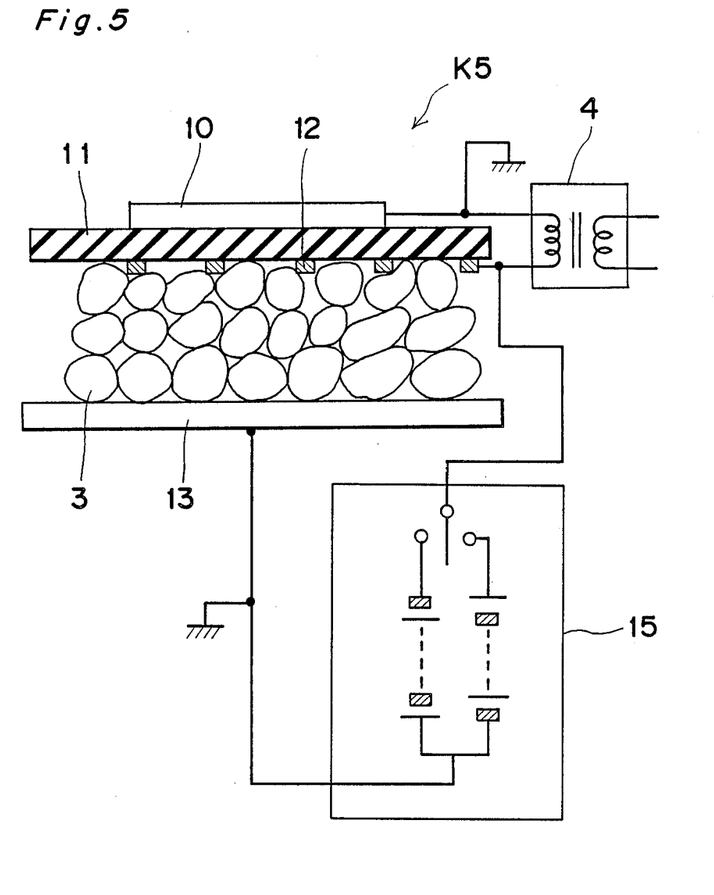

In the plasma generator K5 of FIG. 5, the high-voltage AC power source 14 of the plasma generator K4 is replaced by a high-voltage DC power source 15 such that plasma ions having a positive polarity or a negative polarity can be arbitrarily generated by the plasma generator K5.

Although dielectric granular material 3 is used in the plasma generators K4 and K5, a combination of dielectric granular materials 5 and 6 of the plasma generator K2 (FIG. 2) or a combination of the dielectric material 3 and the metallic or electrically conductive granular material 7 of the plasma generator K3 (FIG. 3) can also be used in the plasma generators K4 and K5.

Figure 6:
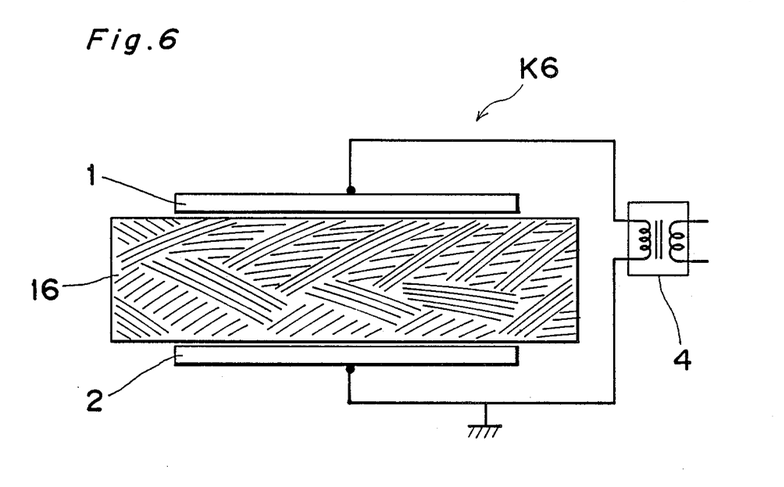

Furthermore, in the plasma generator K6 of FIG. 6, the dielectric granular material 3 of the plasma generator K1 is replaced by a dielectric porous sheet 16. The dielectric porous sheet 16 is a consist of a sheet made of fiber such as glass-wool or a sheet containing a number of foams. Plasma ions are generated by way of space defined in the dielectric porous sheet 16 and therefore, are generated in large amounts. In the plasma generator K6, the dielectric porous sheet can also contain the metallic or electrically conductive granular material 7 of the plasma generator K3 of FIG. 3.

In the plasma generators K1 to K6 referred to above, the dielectric member is arranged to have a very large surface area in order to produce a large amount of plasma ions. Furthermore, it was found that not only a large amount of plasma ions but a large amount of ozone is generated by the plasma generators K1 to K6 and various operations such as disinfection, sterilization, etc. can be performed through utilization of the ozone by the plasma generators K1 to K6.

Figure 7:
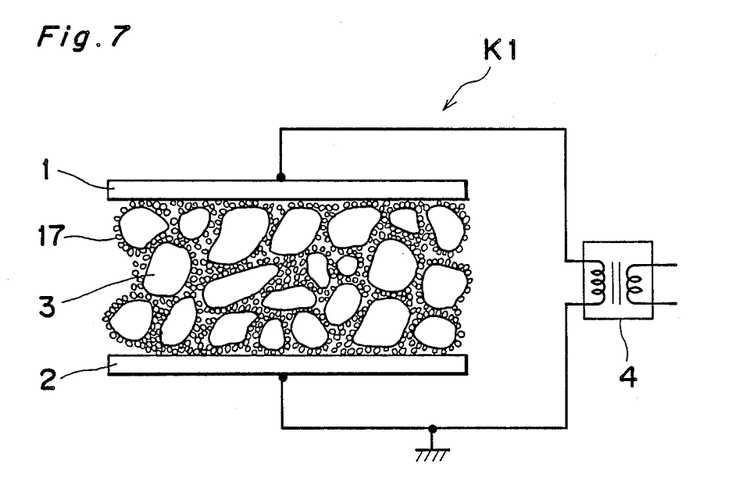
FIG. 7 is a schematic view illustrating the operation of the plasma generator of FIG. 1.

Referring to FIG. 7 illustrating the operation of the plasma generator K1, powdery or granular material 17 to be activated is caused to adhere to surfaces of the dielectric granular material 3. Thus, since cohesion of the powdery or granular material 17 is prevented, the powdery or granular mateial 17 is irradiated by a large amount of plasma ions so as to be activated highly efficiently. Generally, as the particle size of the powdery or granular material 17 is made smaller, adherence of the powdery or granular material 17 to the surfaces of the electrodes 1 and 2 and cohesion of the powdery or granular material 17 are more likely to take place, thereby undersirably lowering efficiency of activation of the powdery or granular material 17. In a state where the powdery or granular material 17 has adhered to the surfaces of the dielectric granular material 3 as shown in FIG. 7, such a phenomenon as adherence of the powdery or granular material 17 to the surfaces of the electrodes 1 and 2 scarcely takes place and cohesion of the powdery or granular material 17 is prevented. In the case where the dielectric granular material 3 is displaced, the dielectric granular material 3 functions so as to scrape off the powdery or granular material 17 adhering to the surfaces of the electrodes 1 and 2 and thus, it becomes possible to prevent the powdery or granular material 17 from adhering to the surfaces of the electrodes 1 and 2.

Meanwhile, even if the powdery or granular material 17 is fine powder which is handled with difficulty, a mixture of the dielectric granular material 3 and the powdery or granular material 17 has properties of coarse powder which can be handled easily. Accordingly, it becomes possible to activate the powdery or granular material 17 remarkably easily. In this case, it is needless to say that the mixture is required to be separated into a dielectric granular material 3 and the powdery or granular material 17 after the activation treatment. The mixture can be easily separated into the dielectric granular material 3 and the powdery or granular material 17 by employing a classifier or immersing the mixture in a solvent. The powdery or granular material 17 can be activated by the plasma generators K2 and K3 in the same manner as described above.

Figure 8:
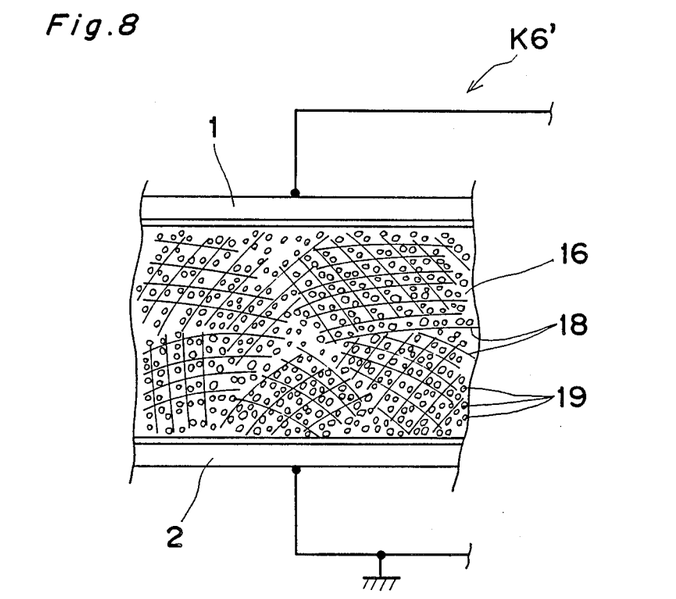
FIG. 8 is a view similar to FIG. 6, particularly showing a modification thereof.

Referring to FIG. 8, there is shown a plasma generator K6′ which is a modification of the plasma generator K6. In the plasma generator K6′, particles 19 of the powdery or granular material 17 are loaded into space defined in the dielectric porous sheet 16 made of fiber 18 and are caused to adhere to surfaces of the fiber 18. If the above described dielectric porous sheet 16 is provided between the electrodes 1 and 2, the particles 19 of the powdery or granular material 17 are irradiated by an extremely large amount of plasma ions and thus, the powdery or granular material 17 is activated by the plasma generator K6′ remarkably efficiently.

As particle size of the powdery or granular material 17 is made smaller, such problems as difficulty in handling the powdery or granular material 17 and adhesion of the powdery or granular material 17 to the surfaces of the electrodes 1 and 2 may arise as described with reference to FIG. 7. However, these problems are obviated in the plasma generator K6′ since the particles 19 of the powdery or granular material 17 are accommodated in the dielectric porous sheet 16. If the dielectric porous sheet 16 is inserted between the electrodes 1 and 2 and then, is displaced, the particles 19 loaded into the dielectric porous sheet 16 are also displaced together with the dielectric porous sheet 16, so that such great advantages can be obtained in the plasma generator K6′ that the powdery or granular material 17 can be handled easily and adhesion of the powdery or granular material 17 to the surfaces of the electrodes 1 and 2 can be prevented. In the plasma generator K6′, it is, needless to say, necessary to perform an operation for loading the powdery or granular material 17 into the dielectric porous sheet 16 and an operation for separating the powdery or granular material 17 from the dielectric porous sheet 16 after the activation treatment. The latter operation can be performed with much ease by using a solvent, etc.

Figure 9:
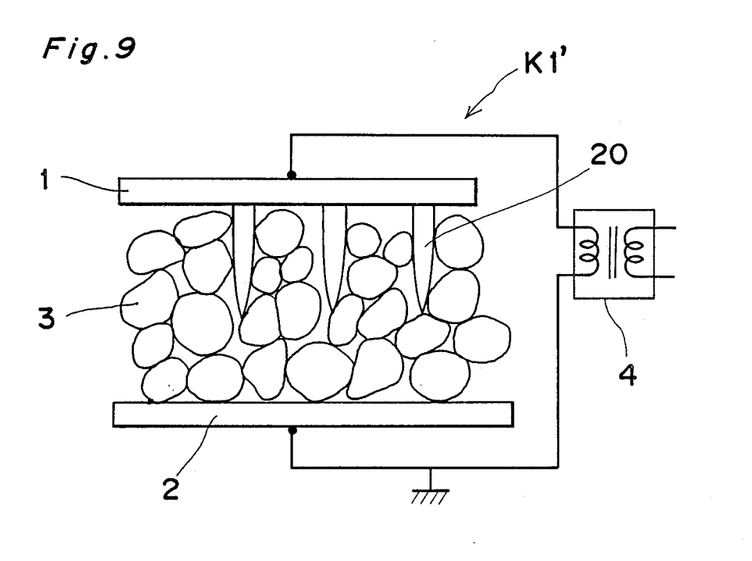
FIG. 9 is a view similar to FIG. 1, particularly showing a modification thereof.

Referring to FIG. 9, there is shown a plasma generator K1′ which is a modification of the plasma generator K1. In the plasma generator K1′, needle-like electrodes 20 (corresponding to excitation electrodes) are provided on the electrode 1 and thus, space in plasma state can be further increased. Such an electrode structure can also be employed in the plasma generators K2, K3, K4 and K5. Since it was found that not only a large amount of plasma ions but a large amount of ozone is generated in the plasma generators K6′ and K1′, the plasma generators K6′ and K1′ can also be used as ozonizers.

Hereinbelow, examples of applications of the plasma generator of the present invention to activation apparatus, e.g. an ozonizer, etc, will be described with reference to FIGS. 10 to 19.

Figure 10:
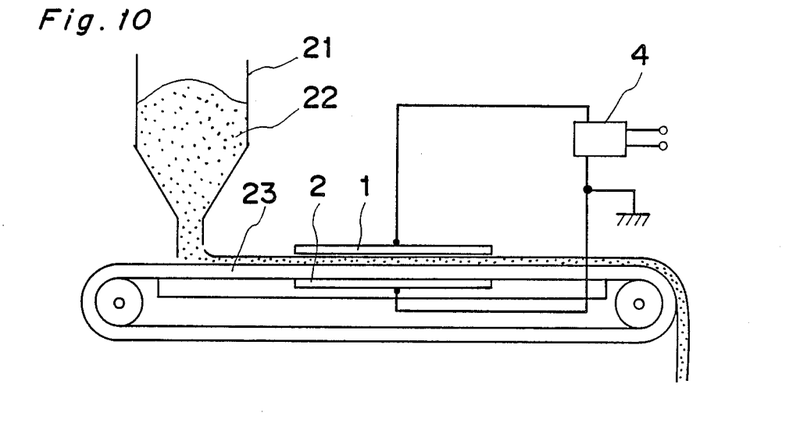
FIGS. 10 to 19 are schematic views illustrating examples of applications of the plasma generator of the present invention to various apparatuses, respectively.

Referring to FIG. 10, there is shown an activation apparatus including a belt feeder in which the plasma generator K1 may be incorporated. Namely, mixed powdery material 22, which is a mixture of powder to be activated and granular material, e.g., glass beads, is stored in a hopper 21. The mixed powdery material 22 is conveyed from the hopper 21 by a belt 23 made of dielectric material so as to be passed between the electrodes 1 and 2 such that the powder is activated. In the activation apparatus, cohesion of the powder to be activated does not take place and adherence of the powder to the belt 23 scarcely occurs, thereby resulting in higher efficiency of activation of the powder. Meanwhile, the powder is also exposed to a large amount of ozone so as to be sterilized.

Figure 11:
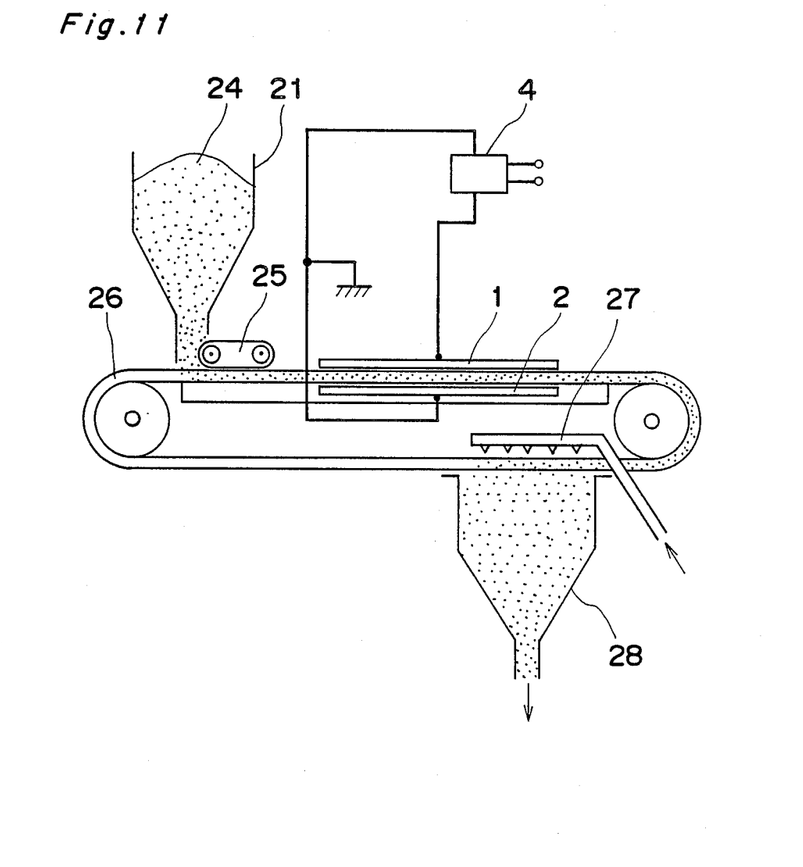

Referring to FIG. 11, there is shown an activation apparatus including a belt feeder in which the plasma generator of the present invention is incorporated. The belt feeder is provided with a belt 26 having a construction similar to that of the dielectric porous sheet 16. Powder 24 to be activated is stored in the hopper 21 and is forced into the belt 26 by a discharge presser 25 so as to be dispersed into the belt 26. Thus, when the belt 26 passes between the electrodes 1 and 2, the powder 24 is activated. Thereafter, the powder 24 in the belt 26 is blown off into a hopper 28 by an air jet blower 27 so as to be further transported to the next process.

Figure 12:
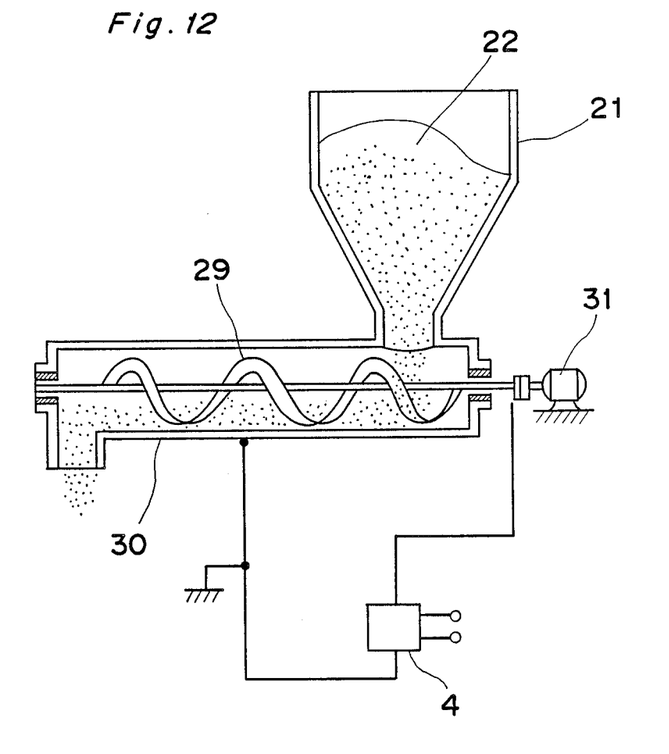

In FIG. 12, there is shown an activation apparatus including a screw feeder in which the plasma generator K1, K2 or K3 may be incorporated. In the activation apparatus, an AC high voltage from the high-voltage AC power source 4 is applied between a screw 29 corresponding to the electrode 1 and a cylinder 30 corresponding to the electrode 2. The mixed powdery material 22 is stored in the hopper 21 and is discharged out of the cylinder 30 by the screw 29 which is driven by a motor 31. The powder in the mixed powdery material 22 is irradiated by a large amount of plasma ions during transport of the mixed powdery material 22 in the cylinder 30 so as to be activated. Even if the powder to be activated is fine powder, the mixed powdery material 22 has properties of coarse powder and therefore, can be handled with much ease.

Figure 13:
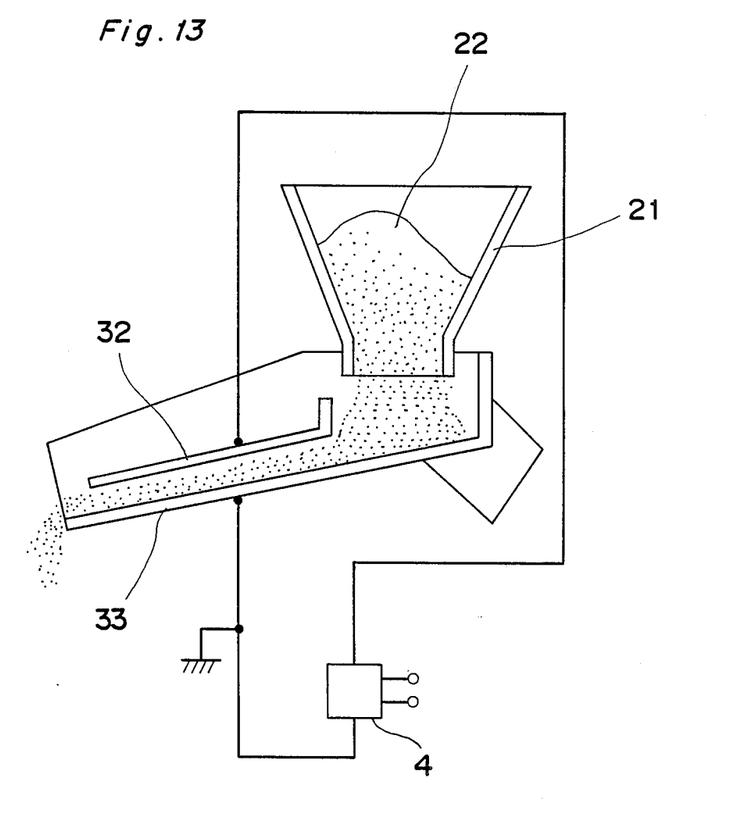

Referring to FIG. 13, there is shown an activation apparatus including an electromagnetic feeder in which the plasma generator of the present invention is incorporated. In the activation apparatus, an AC high voltage from the high-voltage AC power source 4 is applied between electrodes 32 and 33. Thus, when the mixed powdery material 22 is passed between the electrodes 32 and 33, the mixed powdery material 22 is irradiated by a large amount of plasma ions. Meanwhile, the electrodes 32 and 33 can be replaced by those shown in FIGS. 4, 5 and 9. In this case, such an advantage can be gained that a vibrating feeder unsuitable for feeding of fine powder can be used for an activation apparatus for activating fine powder. Although many other types of feeders for feeding powdery or granular material can be employed in the activation apparatus, it is possible to incorporate the plasma generator of the present invention in these feeders in a manner similar to one of those referred to above.

Figure 14:
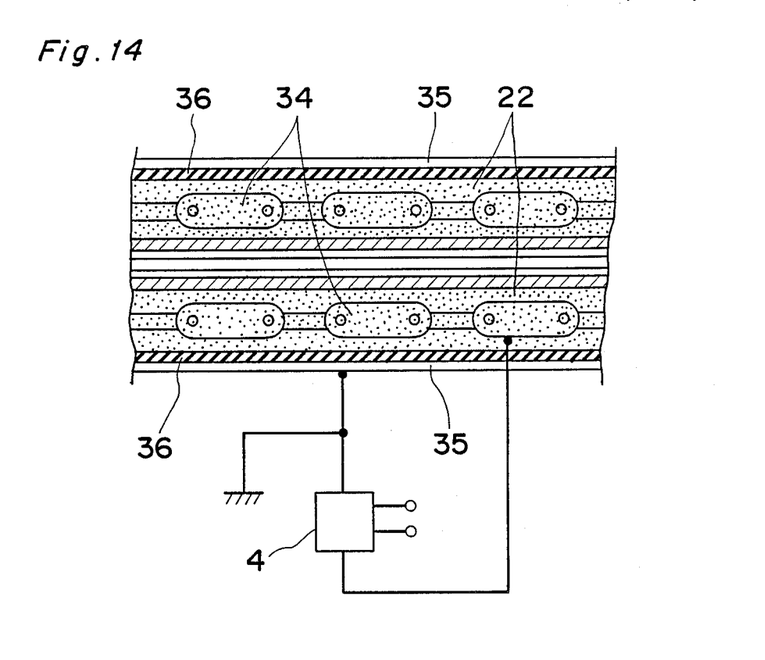

In FIG. 14, the plasma generator of the present invention is incorporated in a transport apparatus including a chain conveyor. In the transport apparatus, an AC high voltage from the high-voltage AC power source 4 is applied between a chain 34 and a casing 35 having the chain 34 accommodated therein. The casing 35 is lined, on its inner face, with a dielectric sheet 36. The powder in the mixed powdery material 22 is activated when the mixed powdery material 22 is transported in the chain conveyor by the chain 34. It is to be noted that FIG. 14 illustrates a portion of the chain conveyor having a large length. However, it is not necessary to install a number of such plasma generators over the overall length of the chain conveyor. Thus, it is possible to arrange only the portion of the chain conveyor as shown in FIG. 14 as a plasma generator. The plasma generator of the present invention can be likewise incorporated in other types of transport apparatuses.

Figure 15:
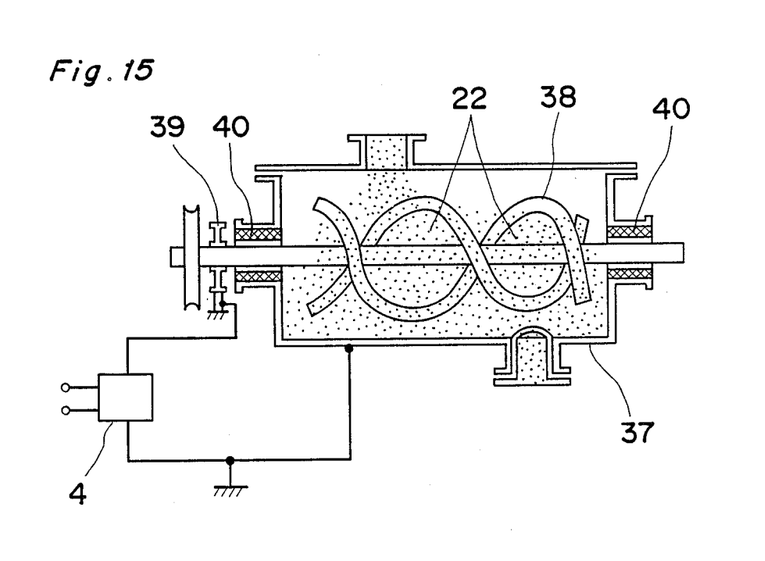

Referring to FIG. 15, there is shown an activation apparatus including a mixer in which the plasma generator K1 or K2 may be incorporated. In the activation apparatus, an AC high voltage from the high-voltage AC power source 4 is applied between a mixer body 37 and a mixing blade 38. Electric power from the high-voltage AC power source 4 is supplied to the mixing blade 38 through a brush mechanism 39 and an insulating bush 40. When the mixed powdery material 22 is agitated in the mixer together with another powdery or granular material charged into the mixer so as to be mixed therewith, the powder in the mixed powder material 22 is activated. At the same time, the powder in the mixed powdery material 22 is exposed to a large amount of ozone. In the activation apparatus of FIG. 15, the plasma generator K4, K5 or K1' may be employed.

Figure 16:
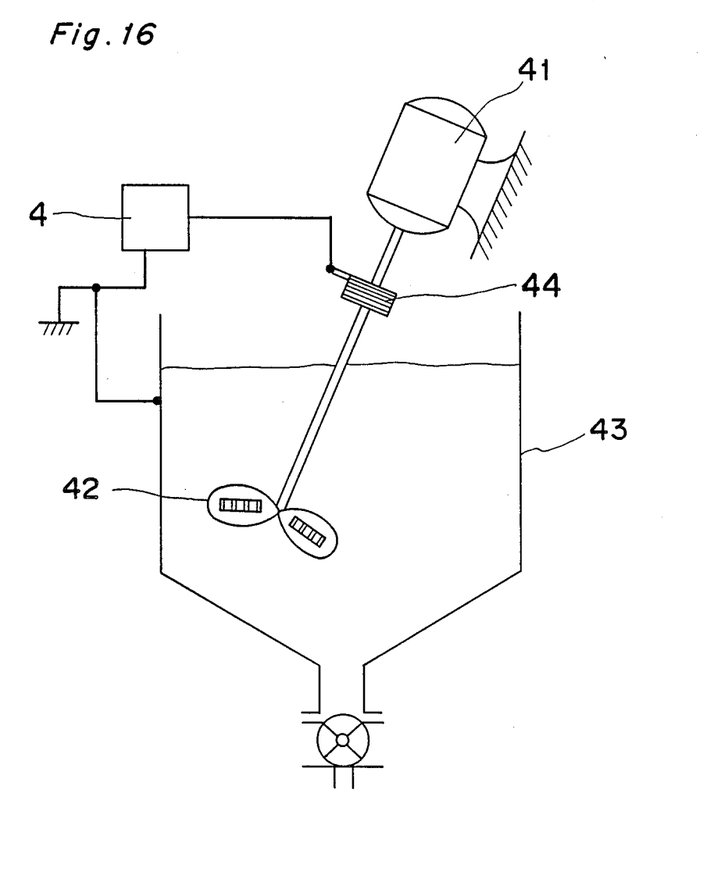

Referring to FIG. 16, there is shown an agitator in which an agitating blade 42 corresponding to the electrode 1 and a tank 43 corresponding to the electrode 2 are provided. Electric power from the high-voltage AC power source 4 is supplied to the agitating blade 42 through a brush mechanism 44. A predetermined amount of a few kinds of the powdery or granular materials to be activated are charged into the tank 43 in addition to the dielectric granular material 3 and are agitated together with the dielectric granular material 3 by the agitating blade 42 so as to be not only mixed with the dielectric granular material 3 but activated, thus resulting in remarkably timesaving activation treatment. In the agitator 41, the plasma generator K4, K5 or K1' can also be employed if necessary. Commercially available agitators can also be used as an activation apparatus in the same manner as described above.

Figure 17:
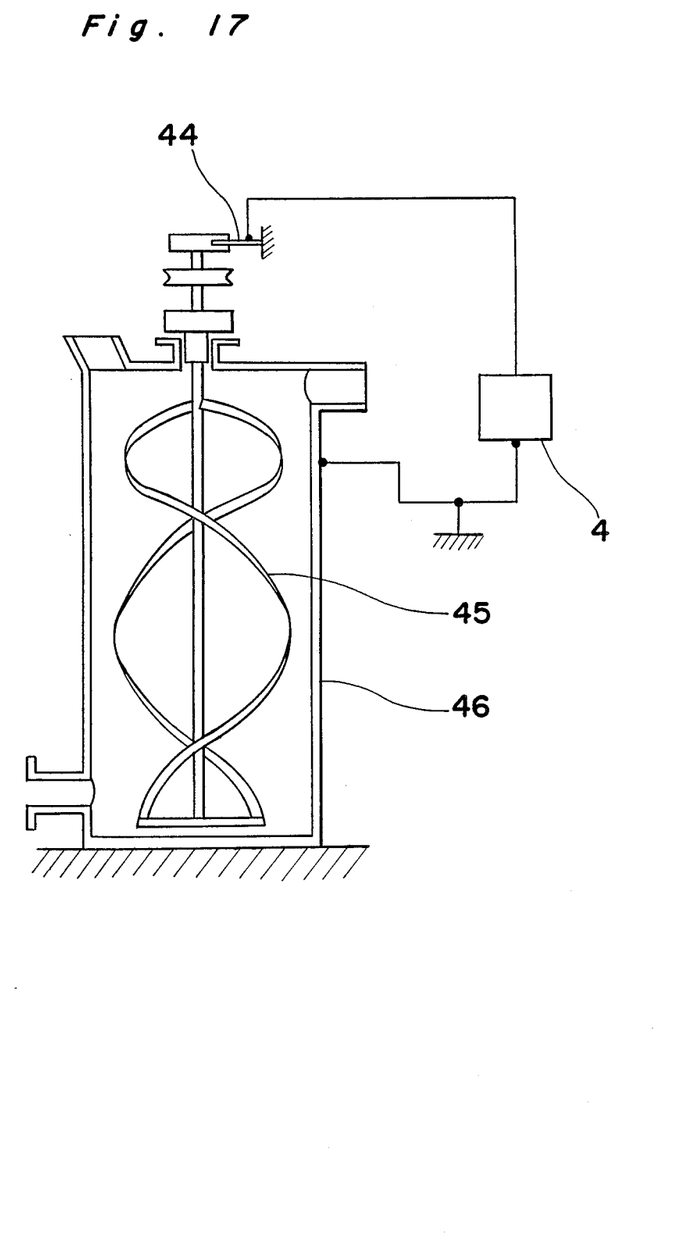

Referring to FIG. 17, there is shown a grinder for grinding granular material into fine powder, in which the plasma generator of the present invention is incorporated. The grinder of FIG. 17 has such an advantage that the powder to be activated is activated at the same time when the power to be activated and the dielectric granular material are ground and mixed with each other. In the grinder, a rotary blade 45 and a body 46 correspond to the electrodes 1 and 2, respectively. Electric power from the high-voltage AC power source 4 is supplied to the rotary blade 45 by way of a brush mechanism 44. In the grinder of FIG. 17, the plasma generator K4, K5 or K1' can also be employed. Commercially available grinders can also be used as an activation apparatus or an ozonizer by employing the plasma generator of the present invention in the same manner as described above.

Figure 18:
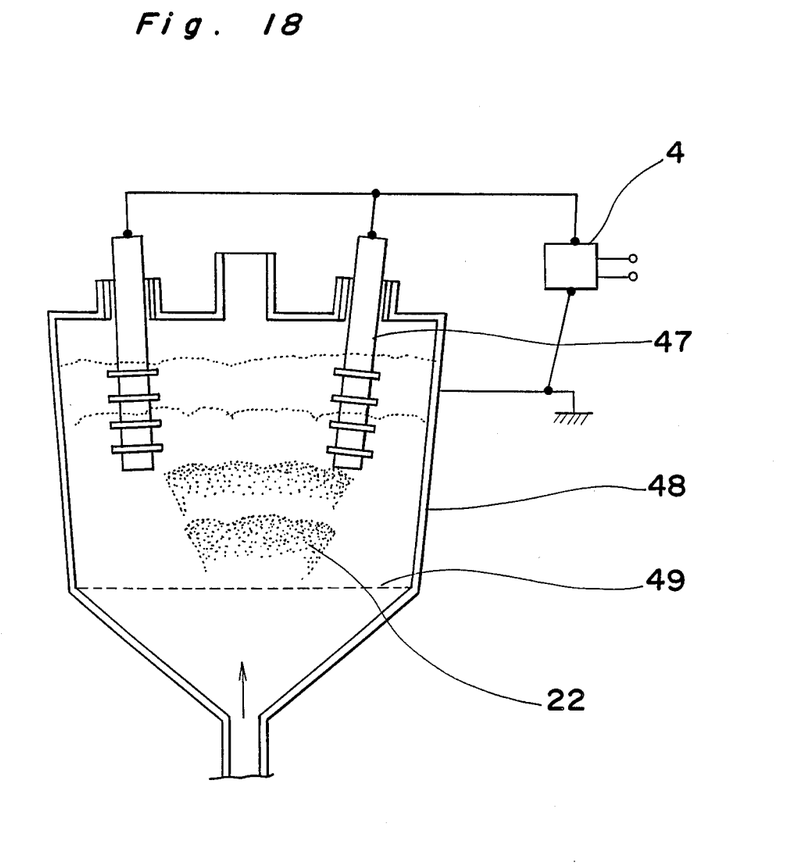

Referring to FIG. 18, there is shown a fluid bed to which the present invention is applied. In the arrangement of FIG. 18, an electrode 47 and a body 48 correspond to the electrodes 1 and 2, respectively. The mixed powdery material 22 charged into the body 48 is fluidized by gas injected upwardly from a filter 49 disposed at a lower portion of the body 48 and, at the same time, is activated. If the injected gas is air or oxygen, the mixed powdery material 22 is also exposed to a large amount of ozone. Thus, the mixed powdery material 22 is not only activated but subjected to various physical and chemical treatments.

Figure 19:
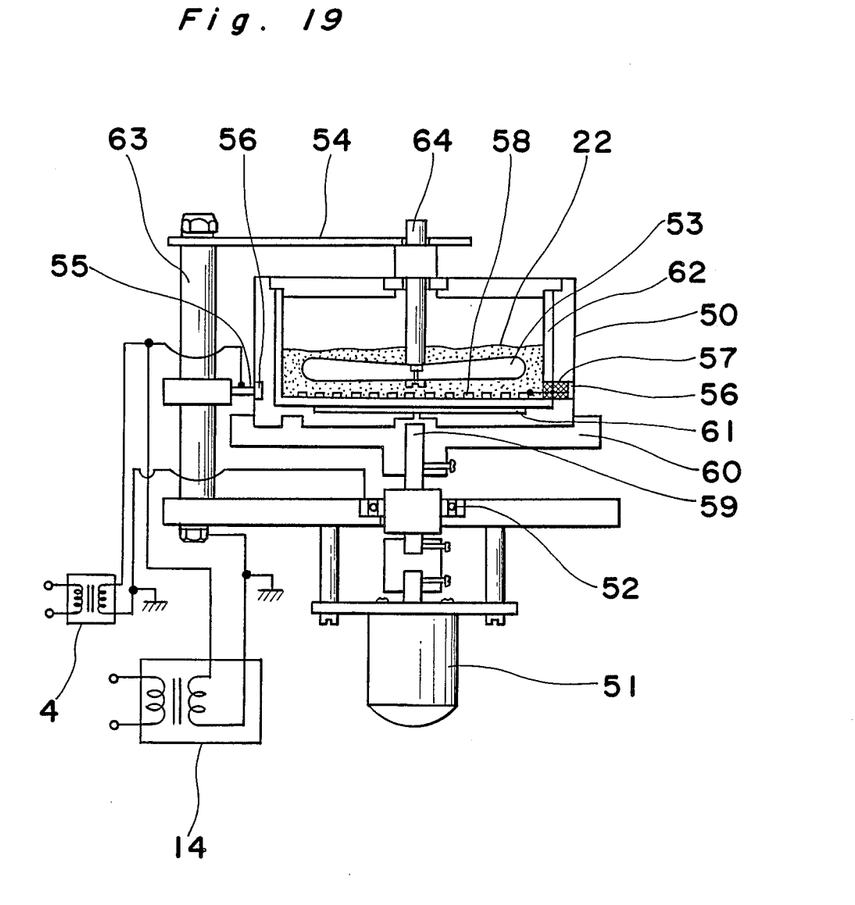

Referring finally to FIG. 19, there is shown a container 50 in which the plasma generator K4 is incorporated. The container 50 is arranged to be rotated by a motor 51 and a bearing 52. A blade 53 corresponding to the electrode 13 of FIG. 4 is mounted to a leaf spring 54. An AC high voltage from the high-voltage AC power source 4 is applied, through a brush mechanism 55, a contact ring 56, and an insulating bush 57, to an electrode 58 corresponding to the electrode 12 of FIG. 4 and is also applied, via the bearing 52, shaft 59 and a table 60, to an electrode 61 corresponding to the electrode 10 of FIG. 4. An inner face of the container 50 is coated with a dielectric lining 62. Meanwhile, an AC high voltage from the high-voltage AC power source 14 is applied to the blade 53 by way of a support shaft 63, the leaf spring 54 and a shaft 64 and is also applied to the electrode 58.

In the above described arrangement of the container, the mixed powdery material 22 charged into the container 50 is activated. If the high-voltage AC power source 14 is replaced by the high-voltage DC power source 15 of FIG. 5, the mixed powdery material 22 is activated by plasma ions having a desired one of positive polarity and negative polarity.

In the container 50, such problems as cohesion and adherence of the powder to the electrodes are eliminated even if the powder to be activated is fine powder. Furthermore, in the container 50, the powder can be activated remarkably efficiently. Moreover, the container 50 may also be used as a kneader.

It will be readily seen from the description given so far that the plasma generator of the present invention has a wide range of applications including an activation apparatus, an ozonizer for generating a large amount of ozone, etc.

As is clear from the foregoing, in the plasma generator of the present invention, granular material which is at least partially composed of dielectric grains or a porous sheet which is at least partially made of dielectric material is provided, as a dielectric member, between the electrodes subjected to a high voltage. Accordingly, in the plasma generator of the present invention, since a surface area of the dielectric member becomes extremely large, an exceedingly large area in plasma state is produced. When the powdery or granular material is activated by the plasma generator of the present invention, cohesion and adherence of the powdery or granular material to the electrodes are eliminated. Thus, the powdery or granular material can be activated highly efficiently and can be handled with much ease. Meanwhile, if atmosphere between the electrodes is air or oxygen, not only plasma but ozone is generated. Consequently, the plasma generator of the present invention can be used for sterilizing with ozone or may be used as an ozonizer.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a plasma generator including an excitation electrode and an opposite electrode confronting said excitation electrode for generating plasma when high voltage is impressed between the excitation electrode and the opposite electrode, the improvement comprising:
a porous sheet extending between the excitation electrode and the opposite electrode, said porous sheet comprising dielectric material having metallic granular material dispersed therein.

2. An activation apparatus comprising:
a plasma generator having an excitation electrode, an opposite electrode confronting said excitation electrode and between which high voltage is impressed for generating plasma, and a porous sheet extending between the excitation electrode and the opposite electrode, said porous sheet comprising dielectric material having metallic granular material dispersed therein.

3. An ozonizer comprising:
a plasma generator having an excitation electrode, an opposite electrode confronting said excitation electrode and between which high voltage is impressed for generating plasma and ozone, and a porous sheet extending between said excitation electrode and said opposite electrode, said porous sheet comprising dielectric material having metallic granular material dispersed therein.

4. In a plasma generator including an excitation electrode and an opposite electrode confronting said excitation electrode for generating plasma when high voltage is impressed between the excitation electrode and the opposite electrode in an atmosphere containing no oxygen, the improvement comprising:
a granular material disposed between the excitation electrode and the opposite electrode, said granular material comprised of dielectric grains and metallic grains.

5. An activation apparatus comprising:
a plasma generator disposed in an atmosphere containing no oxygen and having an excitation electrode, an opposite electrode confronting said excitation electrode and between which high voltage is impressed for generating plasma, and granular material disposed between said excitation electrode and said opposite electrode, said granular material comprising dielectric grains and metallic grains.

* * * * *